No. 738,982. PATENTED SEPT. 15, 1903.
A. BUNTENBACH.
EARTH AUGER.
APPLICATION FILED JUNE 23, 1903.
NO MODEL.
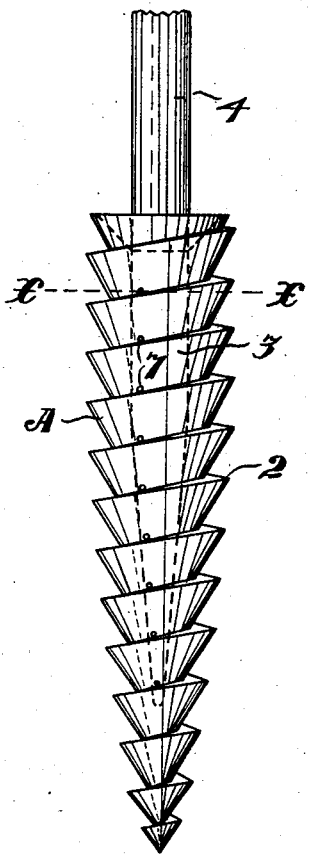
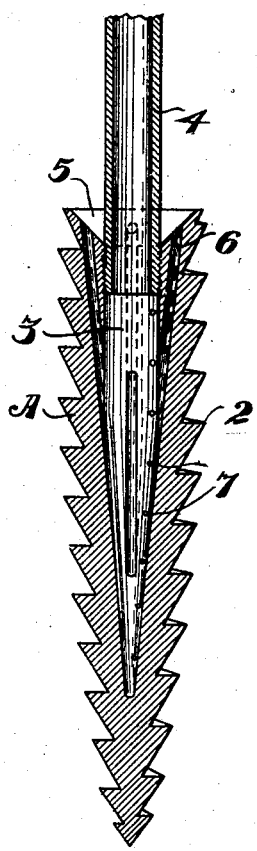
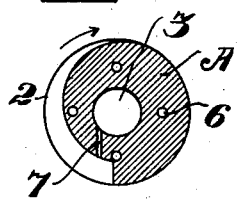
Witnesses,
Inventor,
August Buntenbach
By Geo. H. Strong
Atty No. 738,982. Patented September 15, 1903.

UNITED STATES PATENT OFFICE.

AUGUST BUNTENBACH, OF LONDON, OREGON.

EARTH-AUGER.

SPECIFICATION forming part of Letters Patent No. 738,982, dated September 15, 1903.

Application filed June 23, 1903. Serial No. 162,755. (No model.)

*To all whom it may concern:*

Be it known that I, AUGUST BUNTENBACH, a citizen of the United States, residing at London, county of Lane, State of Oregon, have invented an Improvement in Earth-Augers; and I hereby declare the following to be a full, clear, and exact description of the same.

My invention relates to improvements in devices for boring holes in the ground for the reception of fence-posts and the like.

Its object is to provide an auger of simple construction having means for feeding constantly a small quantity of water into the hole to soften the earth and aid in the boring.

It consists in the parts and the construction and combination of parts, as hereinafter more fully described, having reference to the accompanying drawings, in which—

Figure 1 is a side elevation of an earth-auger embodying my invention. Fig. 2 is a longitudinal sectional view of the same. Fig. 3 is a cross-section on the line *x x* of Fig. 1.

A represents a tapered auger with a sharpened salient spiral cutting edge 2 and terminating at the lower end in a screw-point. The auger is provided with a central longitudinal water-chamber 3.

4 is the hollow shank, screwing into the upper end of the auger. An annular channel or funnel 5 is formed in the end of the auger around the shank and is in communication with chamber 3 through a series of inclined ports 6.

7 represents a series of small ports disposed the length of the auger and opening outward from chamber 3 into the recesses of the spiral. These ports 7 are inclined backwardly from the direction of rotation of the auger, as indicated in Fig. 3, and enter chamber 3 more nearly tangential thereto. Obviously they are thus less likely to become clogged than if they extended radially.

In operation water is poured into chamber 3 either through funnel 5 and ports 6 or through the hollow shank 4, whence it gradually escapes through the small lateral inclined ports 7 to soften the earth and cause the loosened dirt to form a paste, whereby it may be more easily removed from the hole.

Having thus described my invention, what I claim, and desire to secure by Letters Patent, is—

1. An earth-auger comprising a tapered body portion having a helical peripheral cutting edge, said body inclosing a chamber, the latter provided with one or more inlet-passages and with lateral tangential outlets.

2. As a new article of manufacture, an earth-auger characterized by a centrally-located water-chamber, an inlet-passage and lateral, backwardly-inclined outlet-ports.

3. The combination of a tapered auger having a central longitudinal chamber and a shank, an annular funnel surrounding said shank, ports formed in the solid portions of the auger connecting said funnel and chamber, and lateral discharge-ports.

In witness whereof I have hereunto set my hand.

AUGUST BUNTENBACH.

Witnesses:
M. KIRSCH,
V. MARTINEZ.